March 8, 1938. F. M. ARCHIBALD 2,110,283
PROCESS OF REMOVING CORROSIVE SULPHUR COMPOUNDS FROM PETROLEUM OIL
Filed May 2, 1935
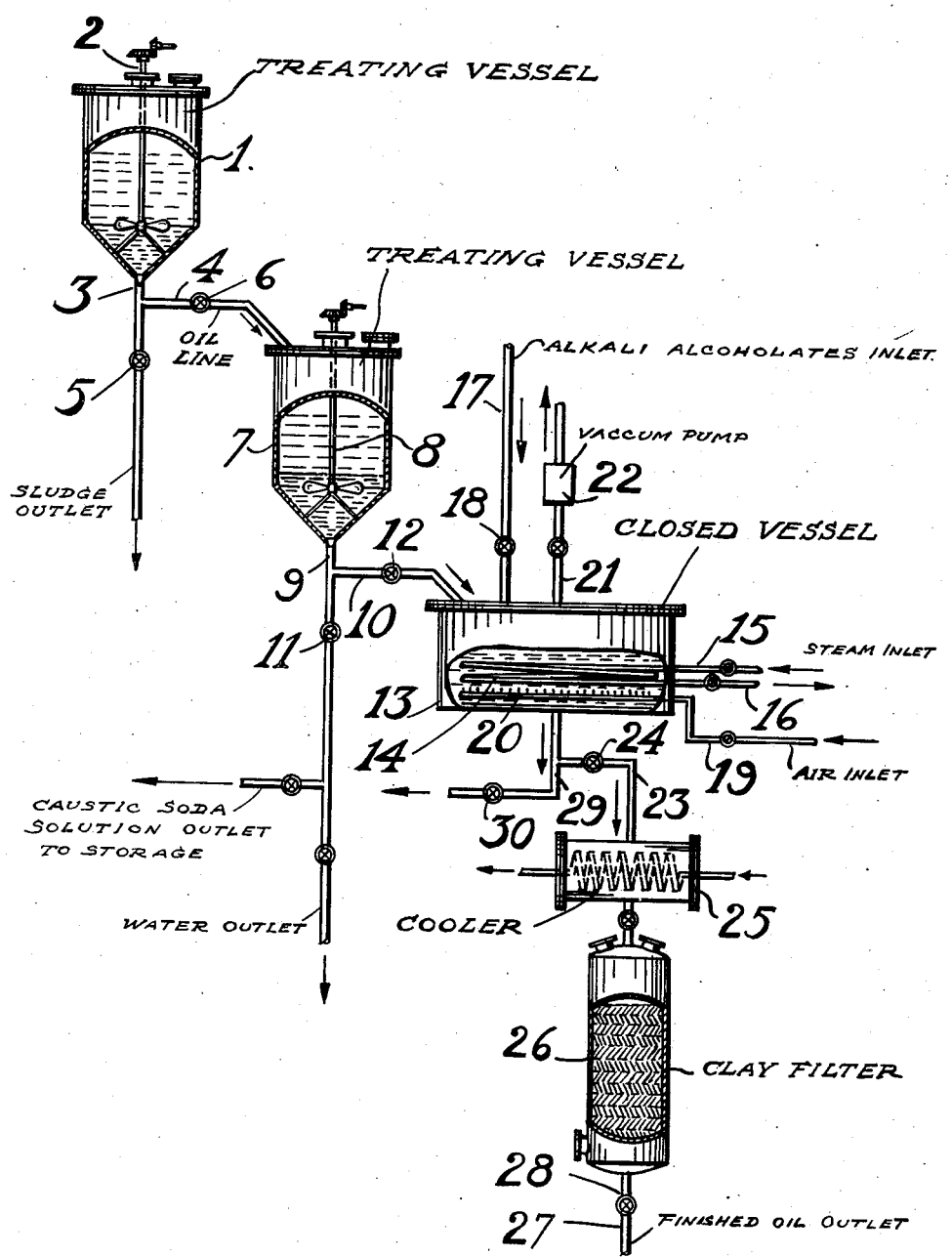

Patented Mar. 8, 1938

2,110,283

UNITED STATES PATENT OFFICE 2,110,283

PROCESS OF REMOVING CORROSIVE SULPHUR COMPOUNDS FROM PETROLEUM OIL

Francis M. Archibald, Elizabeth, N. J., assignor to Standard Oil Development Company, a corporation of Delaware Application May 2, 1935, Serial No. 19,414

7 Claims. (Cl. 196—32)

Hydrocarbon distillates, such as those obtained by the distillation of petroleum, frequently contain corrosive sulphur compounds which are undesirable because of their injurious action on metals or alloys, particularly on copper and alloys containing copper.

Since tubing and other parts made of copper or containing copper are employed extensively in lamps and oil burners, as well as in internal combustion engines operating on petroleum or coal tar distillates as fuels, it is desirable to remove sulphur and corrosive sulphur compounds from such fuels before they are used or stored in metal containers. Corrosive fuels, such as those containing sulphur or organic sulphides or other sulphur derivatives also may cause the formation of crusts on the wicks of lamps and oil stoves as well as corrosion of the burners.

It has been discovered that sulphur or corrosive sulphur compounds may be removed from petroleum and illuminants such as kerosene as well as from hydrocarbon lubricating oil distillates by treating the hydrocarbon oils in contact with alkali alcoholates, such as potassium alcoholates and the like.

The invention will be fully understood from the following description read in connection with the accompanying drawing:

Referring to the drawing, 1 denotes a treating vessel in which hydrocarbon distillates are treated with strong sulphuric acids for example, fuming sulphuric acid. A stirrer driven by a motor or other suitable power device (not shown), is used to obtain a better contact of the hydrocarbon distillate and the sulphuric acid. Pipes 3 and 4 provided with valves 5 and 6 are used to remove the sludge layer and the oil layer which are formed on settling, from the treating vessel 1. The sludge layer is removed to storage not shown. The oil layer is passed into treating vessel 7 where a suitable stirring device 8, similar to that provided in treating vessel 1, is also used.

In treating vessel 7 the oil is treated with caustic soda solution and washed with water. After each treatment or washing, the oil and caustic soda solution or water are allowed to settle in layers. The layers thus formed are removed by means of pipes 9 and 10 provided with valves 11 and 12: the water to the sewer, the caustic soda solution to storage and the oil layer to the closed vessel 13. If desired the oil in treating vessel 7 may be treated with a 50% alcohol solution to remove any acid constituents that may be present instead of washing with caustic soda solution and water.

The closed vessel 13 is provided with a steam coil 14 into which steam is introduced by means of pipe 15 and removed by pipe 16. Any desired temperature may thus be maintained in closed vessel 13.

Alkali alcoholates are introduced into closed vessel 13 by means of pipe 17 provided with valve 18. Air is introduced into closed vessel 13 by means of pipe 19 and spray pipe 20. Pipe 21 is used to remove the vapors from closed vessel 13. The vacuum pump 22 on vapor pipe 21 is used to maintain a pressure below atmospheric pressure. The vacuum pump 22 exhausts to suitable equipment (not shown) for the recovery of alcohol.

The oil after being blown with air to remove the last traces of alcohol is then passed through pipe 23 provided with valve 24 through the cooler 25 to clay filter 26, from which the finished oil is removed through pipe 27 provided with valve 28. Pipe 29 provided with valve 30 is used to bypass the clay filter if desired.

The alkali alcoholates which are employed in this invention to remove corrosive sulphur compounds from hydrocarbon distillates may be prepared by dissolving one to three per cent of the alkali hydroxide in a concentrated alcohol. They may also be made if so desired by reacting alkali metals with alcohols in a well known manner. When alcoholates of the higher alcohols are employed, such as the alcoholates of isopropyl, secondary butyl or secondary amyl alcohols or of the corresponding primary alcohols, it may be necessary to heat the mixture of alcohol and the alkali hydroxide to facilitate solution of the alkali. It is evident that comminution of the alkali decreases the time and heating needed to dissolve the alkali hydroxides. The alkali hydroxides are more soluble in an alcohol such as isopropyl alcohol than in higher alcohols.

For example, the treatment of hydrocarbon distillates to enable them to pass the copper strip corrosion test as applied to kerosene is performed as follows:

Potassium alcoholate is prepared by dissolving 2 to 3 per cent of potassium hydroxide in an anhydrous alcohol. Isopropyl and ethyl alcohols have been used in practicing the invention, but other alcohols may be employed. When higher alcohols are used it is necessary to heat to 85° C. or more in order to hasten the solution of the potassium hydroxide.

In operating the invention 1 per cent of the potassium alcoholate solution was added to a kerosene having a severe copper corrosion test and the mixture was heated to 70° C. When the potassium hydroxide had dissolved, the kerosene was blown dry with air to drive off the excess of alcohol and at the same time assist in cooling the solution. The kerosene was then filtered through an adsorptive medium such as Attapulgus' clay, in the ratio of 2.5 liters per 100 grams of clay. The resulting product passed the corrosion test.

The kerosene to be treated must not be washed with water before the filtration, for if this be done the effect of the potash is negative because of the hydrolysis of the potassium sulphur compound. Water washing of the oil after the filtration step causes no damage to the oil.

The following is an example of the method of applying the treatment to kerosene:

The distilled oil, after the treatment with sulphuric acid and after the separation of the acid, is neutralized with caustic soda and thoroughly washed with water. The entrained moisture settles out by gravity on standing and is removed. The oil is then treated with potassium hydroxide dissolved in isopropyl alcohol of 91 to 98 per cent grade. By heating the alcohol, 14 or more per cent of potassium hydroxide is dissolved. One per cent of this solution is added to the oil to be treated which is then agitated by air blowing at 70° C. The air blowing is continued until the odor of the alcohol is removed from the oil. This may be hastened by reducing the pressure to 1 to 10 inches of mercury. The oil is finally cooled and filtered through Attapulgus' clay or an equivalent filtering medium such as activated carbon. The resulting product is stable as to color and odor, and it passes the copper corrosion test. In the above example the ratio of clay to oil was 100 grams of clay to 2.5 liters of oil.

The above process has been used also on white oil of 85 Saybolt viscosity at 100° F. with the following modifications:

The acid treated oil is washed with 50% strength isopropyl alcohol instead of with water as is done in washing kerosene in the above example. Following the washing with alcohol, the oil is steamed at 120° to 160° C. to remove any dissolved moisture and alcohol which it may contain. The alcoholic potash is added directly to the hot oil in the still. The amount of the alcoholic potash may be of the same order as in connection with the kerosene treatment described above. The alcohol which was added with the treating agents is blown out of the oil with air at 150° C. A short period of air blowing is sufficient to remove the alcohol. The oil is then cooled and filtered through Attapulgus' clay or other equivalent filtering medium.

If desired, it is possible to use diminished pressure of 20 to 28 inches of mercury for the removal of the last traces of alcohol left in the treated oil. This is necessary where air may damage the treated oil. The alcohol may be recovered by any sutiable known method, such as adsorption by active carbon. This is profitable when the process is operated on a sufficiently large scale.

The process may also be used in removing corrosive sulphur compounds from other oils such as lubricating oils. The amount of potash required is proportional to the amount of corrosive compound to be removed. This is best determined by a laboratory pilot test on the material to be treated. The minimum amount of alcohol that will dissolve the alcoholate is sufficient for the reaction, the uncombined alcohol undoubtedly functioning merely as a dispersing agent.

The foregoing specific example is intended merely as an illustration and not as a limitation of the invention. It is therefore my intention to claim the invention as broadly as the prior art permits.

I claim:

1. The process of removing corrosive sulphur compounds from petroleum oils, wherein corrosive sulphur compounds have been formed by treatment of the petroleum oils with concentrated sulphuric acid, which comprises adding a substantially water-free alcoholic solution of an alkali hydroxide to the petroleum oil, heating to a temperature from about 85° C. to 160° C., blowing with air to drive off all the alcohol, cooling the oil and filtering the oil through an absorptive clay to separate the alkali sulphur compounds.

2. The process of removing corrosive sulphur compounds from kerosene which had been treated with concentrated sulphuric acid, which comprises adding a substantially water-free alcoholic solution of potassium isopropylate to the kerosene, heating to a temperature from about 85° C. to 160° C., blowing with air to drive off all the alcohol, cooling the kerosene and filtering the kerosene through an absorptive clay to remove the potassium sulphur compounds.

3. The process of removing corrosive sulphur compounds from petroleum oils which corrosive compounds have been formed by treating the petroleum oils with fuming sulphuric acid, which comprises adding a substantially water-free alcoholic solution of potassium isopropylate to the petroleum oils, heating to a temperature of about 85° C. to 160° C., blowing with air to drive off all the alcohol, cooling the oil and filtering the oil through an absorptive clay to separate the potassium sulphur compounds.

4. The process of removing corrosive sulphur compounds from a petroleum oil which have been formed by treating the petroleum oil with concentrated sulphuric acid, which comprises after treating a petroleum oil with concentrated sulphuric acid and removing the sludge produced, of neutralizing the oil with an alkali solution, washing with water, adding a substantially water-free alcoholic solution of an alkali, heating to a temperature of about 85° C. to 160° C., blowing with air to drive off all the alcohol, cooling the oil and filtering the oil through an absorptive clay in which the alkali sulphur compounds are absorbed.

5. A process of removing corrosive sulphur compounds from a petroleum oil distillate which has been formed by treating the petroleum oil with concentrated sulphuric acid, which comprises after treating a petroleum oil distillate with concentrated sulphuric acid and separating the sludge formed, of contacting the separated oil with a water solution of caustic soda, separating the water solution of caustic soda with dissolved impurities therein, washing the separated oil with water, adding a substantially water-free alcoholic solution of potassium hydroxide to the separated oil distillate, heating to a temperature of about 85° C. to 160° C., blowing with air to drive off the last traces of alcohol, cooling the oil and filtering through an absorptive clay in which the potassium sulphur compounds are absorbed.

6. The process of refining petroleum oil distillates which comprises contacting a petroleum oil distillate with concentrated sulphuric acid, separating the sludge formed, neutralizing the separated oil by contacting with a water solution a caustic alkali, separating the water solution of caustic alkali with impurities dissolved therein, contacting the oil with a substantially anhydrous alcoholic solution of an alkali metal hydroxide, whereby compounds of sulphur and alkali metal are formed, heating the mixture of oil, alcohol and alkali metal to a temperature of about 85° C. to 160° C. and blowing with air to remove the last traces of alcohol, passing the treated oil without contacting it with water into and through an absorptive filtration medium in which the compounds of sulphur with the alkali metal are absorbed.

7. Process of removing corrosive sulphur compounds from petroleum oils which corrosive sulphur compounds have been formed by treating petroleum oils with concentrated sulphuric acid which comprises contacting the oil with a substantially anhydrous alcoholic solution of an alkali metal hydroxide, whereby compounds of sulphur and the alkali metal are formed, heating to a temperature of about 85° C. to 160° C. and blowing with air to remove all of the alcohol, passing the treated oil without contacting it with water into and thru an adsorptive filtration medium in which the compounds of sulphur with the alkali metal are adsorbed.

FRANCIS M. ARCHIBALD.